Sept. 25, 1928.
A. A. SAVASKY
LIGHT CONTROL APPLIANCE
Filed July 7, 1926
1,685,438
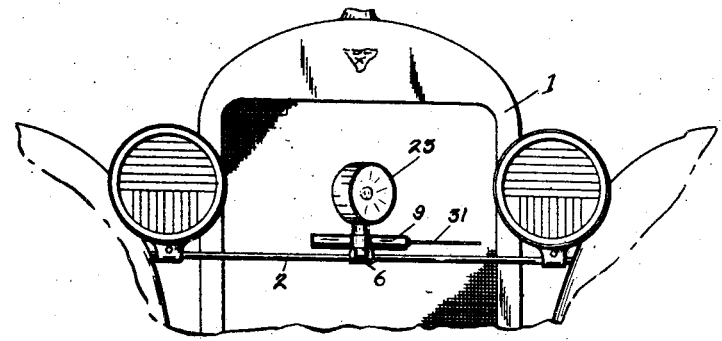
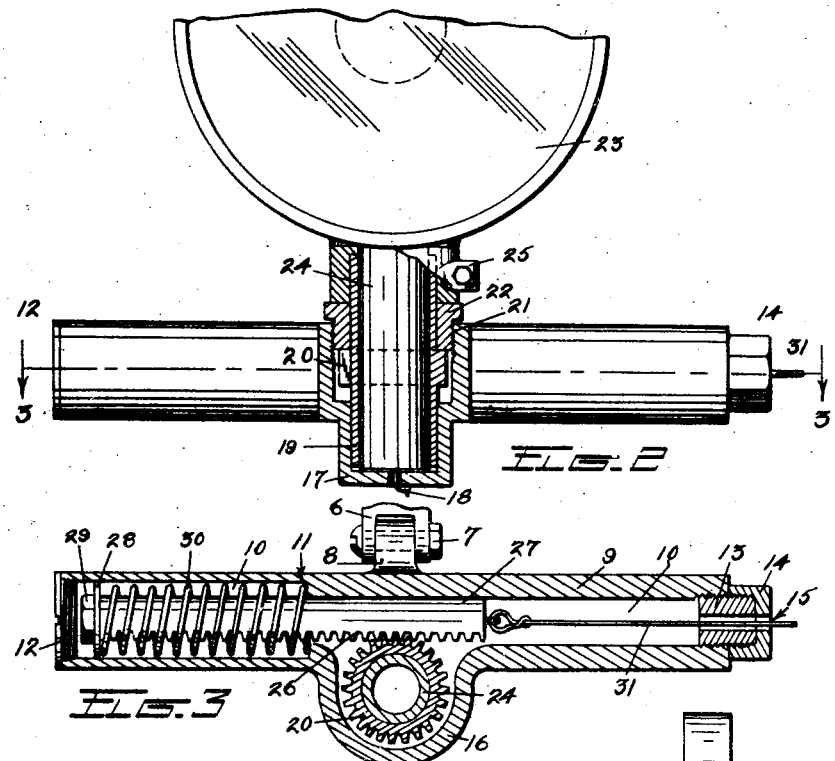
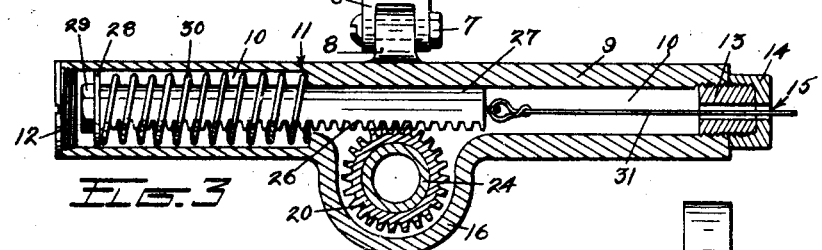
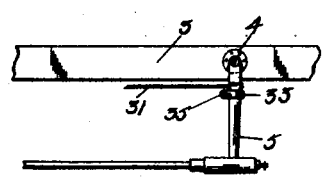
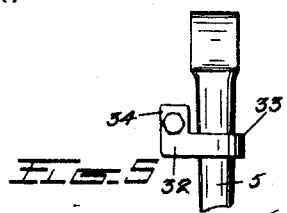
Inventor
Albert A. Savasky Patented Sept. 25, 1928.

1,685,438

UNITED STATES PATENT OFFICE.

ALBERT A. SAVASKY, OF CLEVELAND, OHIO, ASSIGNOR TO THE PATHFINDER ACCESSORIES CORPORATION, OF CLEVELAND, OHIO, A CORPORATION OF OHIO.

LIGHT-CONTROL APPLIANCE.

Application filed July 7, 1926. Serial No. 120,923.

My invention pertains to a light controlling appliance and more particularly to a spot light to be adjustably carried on the front of an automobile and to be automatically turned whenever the steering column of the automobile is turned and so that the light rays will be projected in the same direction in which the front wheels are turned.

The object of my invention is to improve upon known prior constructions both as to appearance and efficiency of operation and incidentally to cheapen the cost of manufacture and ease the action. A further object has been to effect a flexible connection between a turnable element of the appliance and the pitman or steering arm, and preferably such connection, since already built and successfully used, will consist of a guided wire after the manner admittedly in common use in carburetor controls. A further object has been to provide a plurality of adjustments. Still another object has been the adaptation of a reacting device in a supposedly novel manner.

I realize that the scope of my invention comprehends many equivalent methods and constructions. The showing of the drawing and the particular description are merely specific exemplifications of a plurality of mechanical embodiments and arrangements.

Adverting to the drawings:

Figure I is a fragmentary portion of a front of an automobile showing most of an appliance embodying my invention mounted thereon.

Figure II is an enlarged slightly broken front elevation of the appliance partly sectioned to disclose some of the operating mechanism.

Figure III is a section on line III—III of Figure II.

Figure IV is an elevation of certain details not shown in Figure I.

Figure V is an enlarged transverse fragmentary elevation of a portion of what is shown in Figure IV.

The structure of an automobile 1, includes at its front a cross-bar 2, upon which my invention may be readily attached by means of a clamp to be later identified. The automobile also includes a frame having one beam 3 to which at a point 4 is pivoted a pitman or steering arm 5 which is to be operatively connected, as indicated in Figure IV, with a front wheel, not shown.

The clamp 6 permits of attachment to the bar 2 and has secured to it, by means of a bolt 7, a bracket 8 on an elongated hollow member 9 fashioned with a variformed bore 10, which is larger at one end to provide a shoulder 11. The larger end of the hollow member 9 is closed by a screw cap 12, whereas the opposite end has threaded in it a hollowed nipple 13 carrying a cap 14 provided with an aperture 15. Communicating with the front side of the member 9 at its middle section is an enlargement for a hollow boss 16 and likewise in similar communication at the bottom of the member 9 at its middle section is a hollow boss 17 provided with a center aperture 18 intended for the entry of electric wires. An elongated sleeve 19 is fitted to and adapted to turn in the bore of the boss 17 and at a point lying in the horizontal axial plane of the member 9 carries a pinion 20 illustrated to be integral therewith. The upper end of the sleeve 19 projects outwardly above the member 9 through an appropriately located and screw threaded opening 21. A cap 22 encircles the sleeve 19, cooperates with the screw threads 21 and is designed to engage and hold the pinion 20 in the position in which it appears in Figure II. A lamp 23 has depending from it a hollow stud 24 which is fitted to the interior of the sleeve 19. By means of an adjustable clamp 25 the upper split end of the sleeve 19 may be constricted against the stud 24 so that the parts will turn in unison.

A rack 26 is designed for reciprocal movement lengthwise of the member 9 while in mesh with the pinion 20, as shown in Figure III. The rear portion 27 of the rack 26 is of semi-cylindrical shape to correspond in contour with the rear interior wall of the member 9 for the purpose of effecting a guided action. That part of the rack 26 which occupies the larger bore 10 carries near its end a collar 28, secured by a nut 29, while surrounding the rack 26 is a coil spring 30, the ends of which bear against the shoulder 11 and the collar 28 respectively. The function of the spring 30 is to act to restore the lamp 23 to a position in which it is facing directly forward. Any reciprocal movement imparted to the rack 26 in a direction to the right, as viewed in Figure III, will result in a compression of the spring 30, whereas movement of the rack 26 to the position in which it appears in Figure III is effected without encountering any resistance of the spring 30, indeed, with the aid of the expansive action of said spring and for a reason which will now be explained. Attached to that end of the rack 26 which is nearest the nipple 13, is a wire 31 which passes out through the nipple 13, aperture 15 and after passing over appropriate guides or sheaves located according to the structure of the car and not shown since old practice for which nothing is claimed, is adjustably connected with one arm 32 of a clamp 33 which is secured to the steering arm 5. The adjustable connection is accomplished by means of a screw threaded bushing 34 in screw threaded connection with the arm 32. As will be readily understood, any turning adjustment of the bushing will act to lengthen or shorten the wire 31. The clamp 33 is itself slidably adjustable along the steering arm 5 and may be fixed in any chosen position by means of an adjusting nut 35. Consequently, a double adjustment of the control mechanism is provided, first by lengthening or shortening the flexible wire connection and second by increasing or decreasing the radius of the arc described by the point of connection of the steering arm 5. While the wire 31 is preferably of spring metal and though it is guided, it is naturally easier to pull than to push it and for that reason I have contrived the action of the spring 30 so that it will aid in effecting a shoving of the rack 26 to the left, as viewed in Figure III. The slight resistance of the spring 30, when the rack is pulled near the opposite range of its movement, is, of course, imperceptible to the operator of the steering wheel of an automobile.

I claim:—

In an appliance of the character described for use with an automobile steering element, the combination of a structure including vertically and horizontally extending hollow sections in communication with each other, means for attaching said sections to the front cross bar of an automobile, a sleeve mounted to turn in the vertically disposed section, a pinion secured to the lower portion of said sleeve, a spring actuated rack adapted to reciprocate in the horizontally disposed section and in mesh with said pinion, a spring wire connecting one end of said rack with said steering element and a light including a stud fixed in said sleeve.

Signed by me this 22nd day of June, 1926.

ALBERT A. SAVASKY.